Dec. 7, 1926.
C. N. FORREST
1,609,938
WATERPROOFING SYSTEM AND METHOD OF PRODUCING THE SAME
Original Filed March 14, 1922
FIG. I.
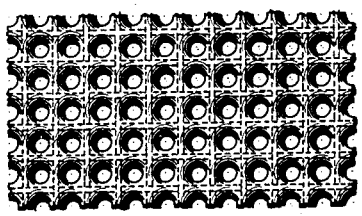
FIG. II.
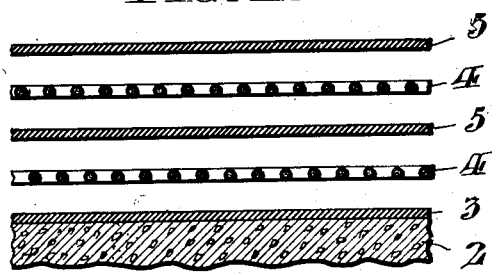
FIG. III.
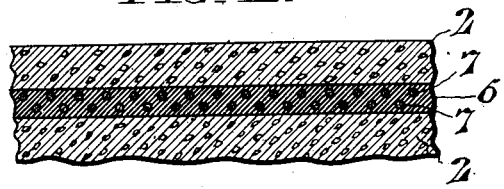
FIG. IV.
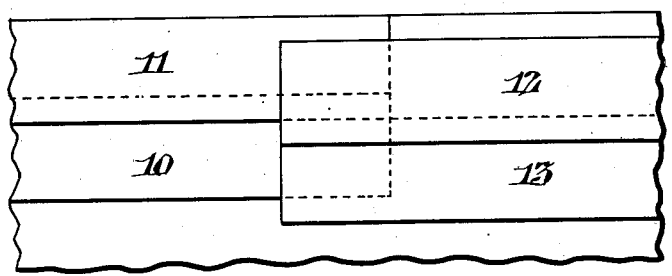
INVENTOR:
Charles N. Forrest,
BY Fraley Paul
ATTORNEYS.
WITNESSES:
John C. Bergner
Alfred E. Zchinger Patented Dec. 7, 1926.

1,609,938

UNITED STATES PATENT OFFICE.

CHARLES N. FORREST, OF RAHWAY, NEW JERSEY, ASSIGNOR, BY MESNE ASSIGNMENTS, TO THE BARBER ASPHALT COMPANY, OF PHILADELPHIA, PENNSYLVANIA, A CORPORATION OF WEST VIRGINIA.

WATERPROOFING SYSTEM AND METHOD OF PRODUCING THE SAME.

Application filed March 14, 1922, Serial No. 543,680. Renewed June 11, 1926.

My waterproofing system relates to the type of waterproofing, which, in engineering practice, is referred to as a membrane system to distinguish it from a so-called integral system.

In an integral system the substance to be rendered waterproof, as for example, hydraulic concrete, is mixed throughout with a substance intended to render the entire structure waterproof; whereas, in a membrane system a special waterproof layer is formed at or near the surface of the structure.

For a long time such waterproof layers have been manufactured of bitumen, and since bitumen possesses no structural strength, layers of bitumen usually alternate with layers of a waterproof reinforcing medium, such as felt saturated and coated with bitumen, usually made up in sheets about a yard wide and of indefinite length.

In such membrane systems these waterproof sheets act as the reinforcing medium while the intervening layers of bitumen serve as a cement to hold the sheets together, and to prevent the passage of water through the joints of the same. This practice results in a laminated system, in which the laminæ can often be readily separated, when the adhesion of the plying bitumen to the fabric is imperfect. Furthermore, it has been found in practice that in the construction of such laminated bituminous membrane water-proofing systems, air pockets are formed at frequent intervals, in the building up of the system, air or vapor being trapped between the laminæ, and this tends to create leaks in the system.

According to my invention, instead of a laminated bituminous structure, I employ in a waterproofing system, a bituminous layer reinforced by an open work or open mesh structure or fabric, which, while imparting strength to the waterproofing system, does not subdivide it into separate laminæ nor occasion the formation of air pockets therein, producing a much more homogeneous structure and one which cannot be split or separated into laminæ.

A waterproofing layer produced according to my invention may be applied to the waterproofing of structures by constructing it at or near the inside or outside of the structure, according to the direction of probable attack by water. Thus, if a building foundation is to be waterproofed, the membrane waterproofing system is applied to the outside of walls, or between two courses of concrete which may form, for example, a cellar floor. If a tank is to be waterproofed, the system is applied to the inside walls and bottom. It may be hidden by ornamental tile or other finish. In a bridge deck, the waterproofing system is applied under the pavement or roadway of the same, and usually covered over with a protecting course of brick or of concrete, etc., so as not to be penetrated by the surface filling. When retaining walls are built in an open cut or excavation, as for a tunnel, and sheet piling is used to hold up the earthen walls, the waterproofing system may be applied upon such sheet piling, and the concrete then poured directly against it.

In the manufacture of my waterproofing system, any suitable type of bituminous waterproofing cement may be used to form the substance of the waterproofing membrane or layer, the precise character depending upon the temperatures and other conditions which the structure is required to meet.

In order to produce my waterproofing system, I employ as a reinforcement an openwork fabric, the general character of which is diagrammatically illustrated in Fig. I. Such a reinforcing fabric is manufactured by taking, for example, a loosely woven fabric, impregnating the fibres and threads with a bituminous saturating medium, and simultaneously more or less coating the threads, but without producing any continuous coating upon the fabric so that the meshes remain open as shown, and the fabric retains an interstitious character. Such a fabric is the subject of an application for a patent which I have filed under date of February 25, 1922, bearing Serial Number 539,090, and accordingly the present invention and the claims which follow do not relate to this reinforcing fabric or its method of production, but solely to the waterproofing system which is produced by its use, and the method of its production.

With reference to the drawings, Fig. I is a fragmentary plan view of the intersticed reinforcement which I employ in connection with my improved waterproofing system;

Fig. II is a diagrammatic illustration showing in separation, the materials arranged in the order in which they are combined to produce my waterproofing system;

Fig. III shows the completed system with the various materials combined; and

Fig. IV illustrates the manner in which I prefer to arrange the reinforcing layers in the system.

Referring first to Fig. II of these illustrations, 2 represents a layer of concrete, the upper surface of which is to have my waterproofing system applied thereto. 3 represents a layer of bituminous waterproofing cement applied thereto. 4, 4, represent the reinforcing fabric, and 5, 5, additional layers of the bituminous cement.

In the manufacture of my waterproofing system I first apply the layer 3 to the surface of the concrete 2. The bitumen is applied when hot enough to be sufficiently fluid to permit of its being placed either by mopping or flooding. Upon this layer there is laid a single layer of the reinforcing fabric 4. This latter is then embedded in the hot bitumen by pressing it thereon and therein, as with a stiff broom, or other suitable means. Over this is applied, as with a mop, another layer of hot bitumen. Then there may be applied another layer of the reinforcing fabric, which is pressed down into and embedded in the underlying bituminous cement, until the latter oozes up through the open meshes or pores thereof; whereupon a further layer of bituminous cement may be applied at the top.

This process of construction may be repeated according to the thickness of the waterproofing layer desired, and to the strength which is required of the reinforcing layers.

When completed a sectional view of my waterproofing layer or membrane will have the appearance shown in Fig. III, where between the layers 2, 2, of concrete there is present a more or less homogeneous layer 6 of bitumen, reinforced by the fibres and threads of the reinforcing fabric or fabrics, which are represented in section at 7, 7. While I have illustrated and described my waterproofing system as built up by the combination of two courses of reinforcing fabric and three coats of bituminous cement, (this being usually a convenient way of making such a structure) it is obvious that it can be similarly built up by combining as many layers as may be desired.

In applying successive layers of the reinforcing fabric (which may conveniently be supplied in the form of rolls about a yard wide) it is desirable to break joints and overlap the layers as shown in Fig. IV, where four different thicknesses of such reinforcing fabric, numbered respectively 10, 11, 12, and 13, are shown superposed with broken joints.

It is characteristic of my invention that the bituminous cement upon which the reinforcing open mesh fabric is laid will ooze up through the open meshes and coalesce with an overlying layer of bitumen applied to the upper surface thereof, so that the bituminous cement is continuous through the entire waterproof structure, forbidding the subsequent splitting or separation of the same into laminæ,—an objection to which previous waterproofing systems have been particularly subject by reason of their laminated structure, in which the bituminous cement does not at any point extend directly through the reinforcing fabric. It is also to be noted that by virtue of the bituminous impregnation and coating of its threads, the fabric reinforcement coalesces with and adheres to the applied bitumen at either side thereof better and more firmly than if the fabric were not pre-bituminated, and its meshes are more completely penetrated or permeated with bitumen, likewise, the impregnation of the threads themselves is more thorough and complete.

It will, therefore, be seen that my system when completed consists of a practically unitary and homogeneous layer of bitumen reinforced with a net work of fabric threads, with positive union and coalescence of the bitumen through the meshes of the reinforcement. And as the threads of the reinforcing fabric are all thoroughly impregnated and coated beforehand with bitumen, there is no danger, in case of fracture of the same, of any water which may accumulate in the system travelling by capillary action through the threads of the fabric thus exposed.

As is usual in these cases, I finally protect my waterproofing system by a course of concrete or brick so as to prevent puncture or fracture thereof from stone, etc., in back fill.

The amount of bitumen for plying the reinforcing fabric will vary somewhat with conditions, but should be about thirty pounds per layer for each one hundred square feet of surface area covered.

The plying bitumen should be about 250° to 275° F., when the fabric is applied, so as to soften and amalgamate with the bituminous coating of the threads, which may have a melting point of about 250° F.

Asphalt is preferred as the plying bitumen, but any bituminous cement or material not antagonistic to the bitumen of the fabric may be used.

Having thus described my invention, I claim:

1. The method of manufacturing a waterproofing system which comprises applying a layer of hot bitumen, applying thereto a pre-bituminated but still interstitious openwork fibrous reinforcing fabric, and applying thereover another layer of hot bitumen, the bitumen at opposite sides of the fabric thus coalescing through its openwork structure and with the bitumen of the fabric.

2. The method of manufacturing a waterproofing system which comprises applying a layer of hot bitumen, applying thereto a pre-bituminated but still interstitious loosely woven fibrous textile fabric reinforcement and embedding the same therein, and applying thereover another layer of hot bitumen; so that air from beneath the reinforcement may escape, and the bitumen at opposite sides thereof coalesce, by passing through the meshes.

In testimony whereof, I have hereunto signed my name at Monroe, N. J., this 10th day of March, 1922.

CHARLES N. FORREST.